July 6, 1926.

B. A. PETERSON 1,591,643

BOBBIN TREATING AND HANDLING MECHANISM

Filed June 7, 1920 10 Sheets-Sheet 1

FIG. 1
PLAN VIEW

Inventor
B A. Peterson
By Luther L. Miller
Attys

B. A. PETERSON

1,591,643

BOBBIN TREATING AND HANDLING MECHANISM

Filed June 7, 1920　　10 Sheets-Sheet 7

Inventor
B. A. Peterson
By Luther L. Miller
Attys

Patented July 6, 1926.

1,591,643

UNITED STATES PATENT OFFICE.

BURT A. PETERSON, OF ROCKFORD, ILLINOIS, ASSIGNOR, BY MESNE ASSIGNMENTS, TO BARBER-COLEMAN COMPANY, OF ROCKFORD, ILLINOIS, A CORPORATION OF ILLINOIS.

BOBBIN TREATING AND HANDLING MECHANISM.

Application filed June 7, 1920. Serial No. 386,991.

The bobbins on which yarn is spun on ring spinning frames are provided with a bore having a relatively large lower portion, an upper portion of small diameter, and an intermediate portion of a diameter intermediate those of the other two portions. The yarn left on the bare spindle in the doffing operation accumulates in the upper portion of the bore and eventually interferes with the proper seating of the bobbin on the spindle of the spinning frame. The present invention contemplates means to remove such yarn or other foreign matter as may collect in the upper part of the bore.

The yarn remaining upon the bobbins when discharged from the looms is frequently removed by grasping the bobbin in the hand and striking the tip of the bobbin against a bench or the like. As a result the tip of the bobbin often becomes battered so that the bore of the tip of the bobbin is obstructed by splinters or wood fibers. Bobbins are also apt to shrink or warp so that they cannot be properly placed upon the spindles. One of the objects of this invention is to provide means for reaming or otherwise truing those parts of the bore of the bobbin which are engaged by the spindle.

A further object of the invention is to assemble the cleaned and reamed bobbins into suitable position for orderly insertion into a magazine.

In the accompanying drawings Figure 1 is a top plan view of that embodiment of the invention which I have selected for illustration herein, a portion of the machine being omitted. Fig. 1ª is a fragmental plan view of one of the members 54ᵉ.

The present embodiment of the invention consists of a bobbin-reconditioning machine adapted to receive a suitable bobbin magazine (as, for example, such a magazine as is used in connection with bobbin doffers for spinning frames), withdraw the bobbins from the magazine and convey them one at a time, first, to a device for forcing out of the small portion of the bore whatever accumulation of lint, yarn, etc., may be contained therein, second, to a device for blowing such material out of the bobbin, third, to a mechanism for reaming the opposite ends of the bore of the bobbin, and, fourth, to a device for assembling the bobbins into position for delivery into another magazine.

Figures 12, 13, 14:
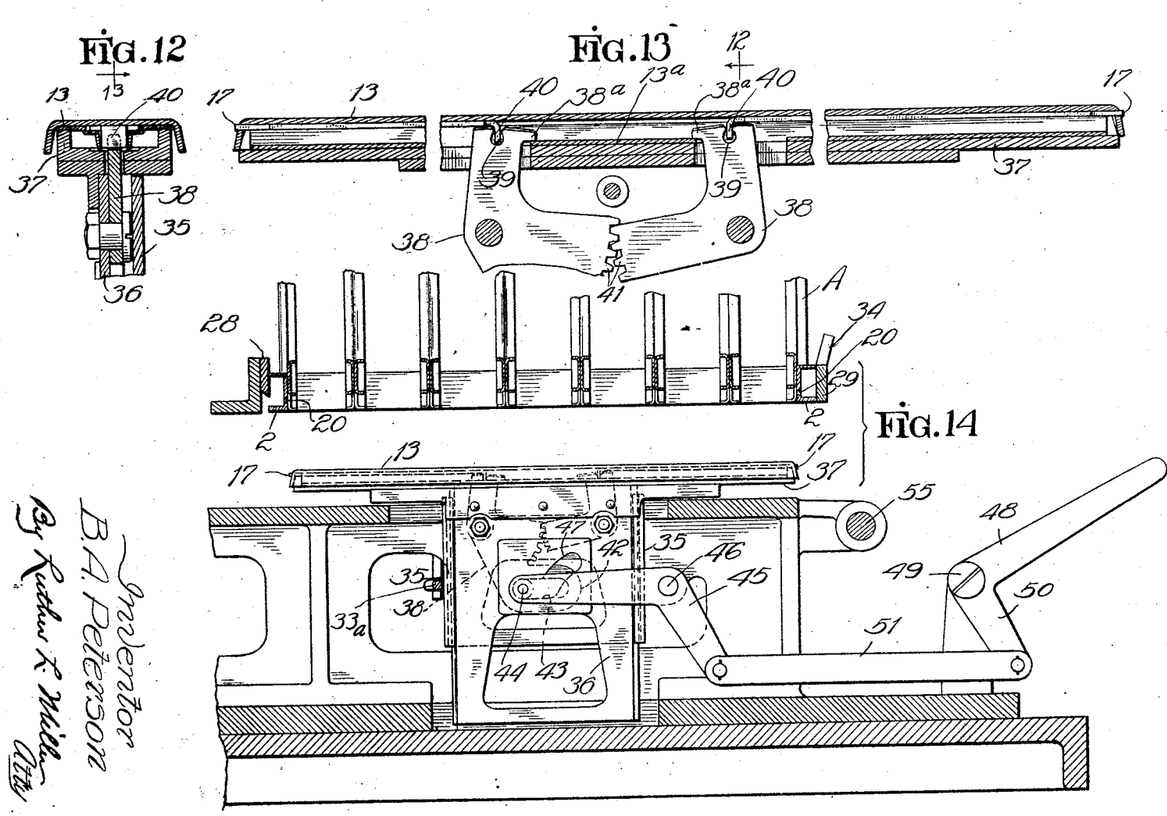
Fig. 12 is a vertical sectional view taken in the plane of dotted line 12 of Fig. 13 and showing the closure for the bobbin magazine and the means for handling said closure.
Fig. 13 is a view taken approximately in the plane of dotted line 13 of Fig. 12.
Fig. 14 is a vertical sectional view through the magazine and the closure-operating mechanism.
Figures 15, 16, 17:
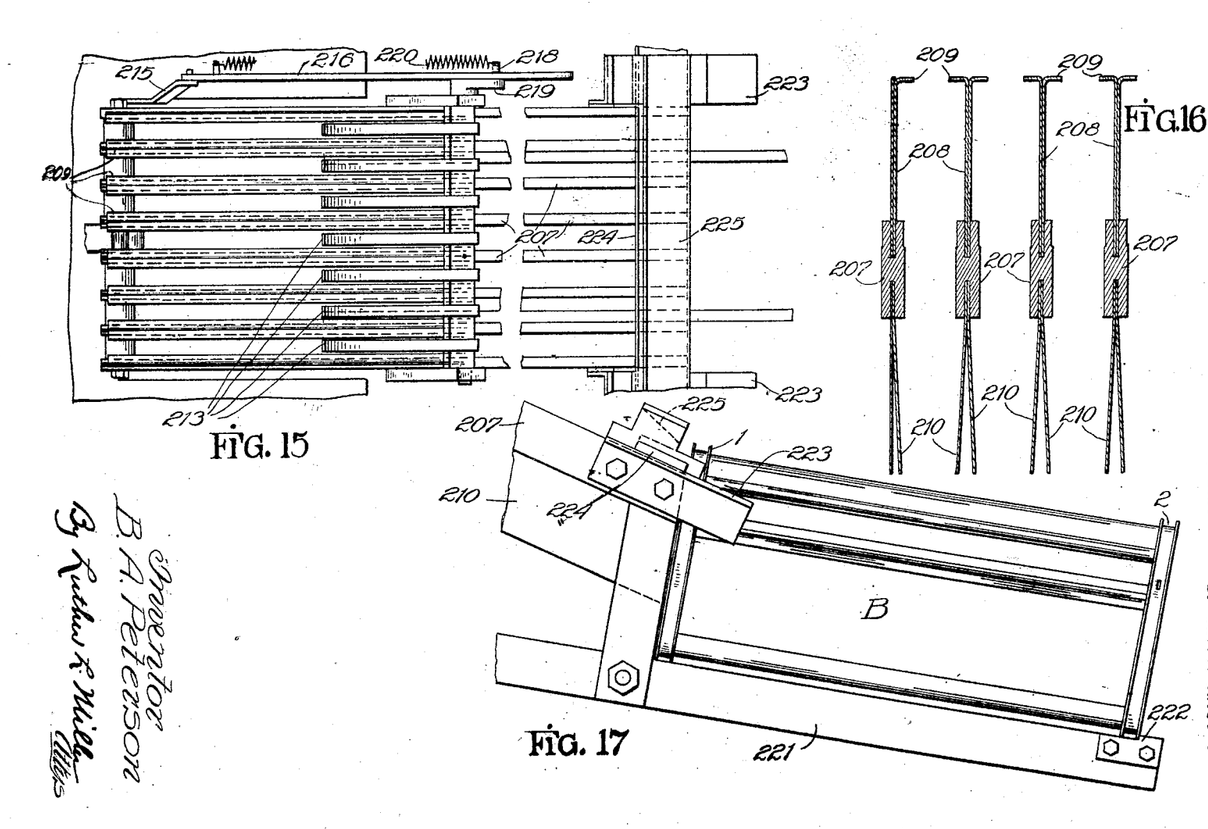
Fig. 15 is a fragmental top plan view of the means for positioning bobbins for insertion in a magazine.
Fig. 16 is a section on line 16—16 of Fig. 6.
Fig. 17 is a view showing the support for the receiving magazine, together with the lower portion of the rack on which the treated bobbins accumulate prior to insertion in the magazine.

Although the invention is not restricted to any particular type of bobbin magazine, the magazines shown at A and B (Figs. 1 and 17) are substantially identical with the one illustrated in Patent No. 1,122,417 dated December 29, 1914. The bobbins are arranged in seven columns in the magazine, the butts of all of the bobbins being at one side of the magazine. The latter comprises two similar rectangular end frames 1 and 2 and partitioning members forming spaces extending from one end of the magazine to the other. The width of each such space is just sufficient to accommodate a single column of bobbins. The lower end of the magazine is normally closed by means of a removable closure, the magazine being so constructed that either end may be the lower end. The closure consists of a plate 13 (Figs. 12, 13 and 14) arranged to underlie the center of gravity of the bobbins. The closure is arranged to be locked in position by means of a latch 17 at each end of the closure, each latch being mounted on the lower side of the closure for limited sliding movement longitudinally of the closure. The outer ends of the latches are arranged to pass through slots 20 (Fig. 14) formed in each end frame of the magazine.

Figure 2:
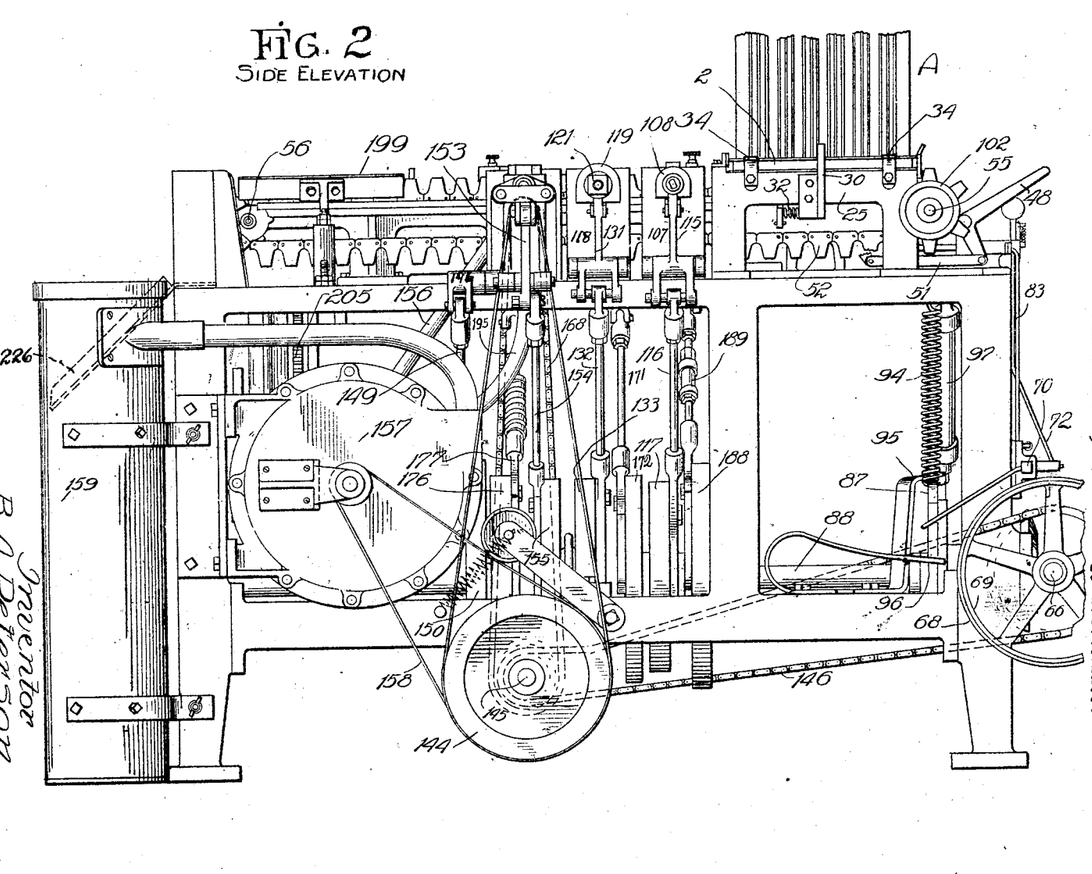
Fig. 2 is a fragmental side elevation of the machine.
Figure 4:
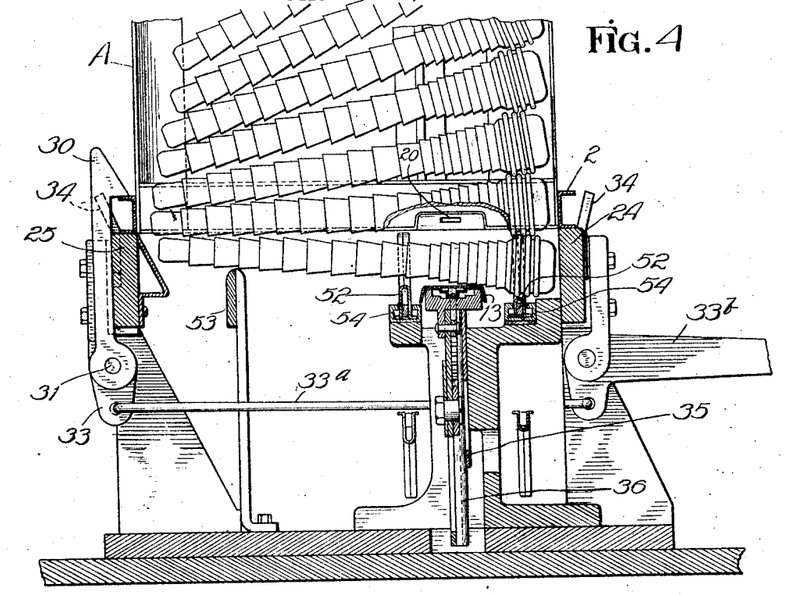
Fig. 4 is a fragmental vertical sectional view taken through the magazine constituting the source of supply of bobbins, the view being taken approximately in the plane indicated by dotted line 4—4 of Fig. 5.
Figure 5:
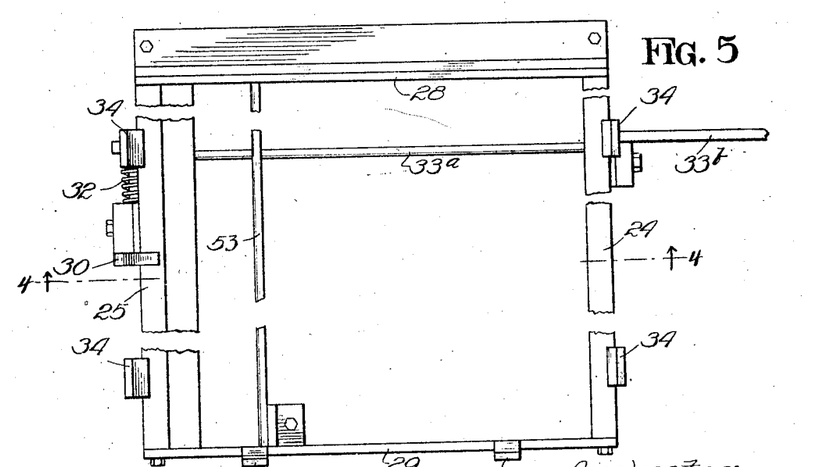
Fig. 5 is a fragmental top plan view of the seat on which said magazine is removably mounted.

The machine comprises means constituting a seat or support for the magazine A. Said means includes two parallel rails 24 and 25 (Figs. 4 and 5), the magazine being held against lateral displacement by means of two stop flanges 28 and 29 and a suitable number of outwardly inclined lugs 34 on the rails 24 and 25. Similar lugs 34 are provided on the flange 29. The lugs 34 assist in properly locating the magazine upon its seat. The magazine is held against upward displacement by suitable means as, for instance, a hook 30 (Fig. 4) fixed upon a rock shaft 31, said hook being normally held in operative position by a torsion spring 32 (Figs. 2 and 5). Attached to the shaft 31 is an arm 33 which is connected by a rod 33$^a$ to a bell-crank hand lever 33$^b$.

The parts thus far described are generally similar to the correspondingly numbered parts shown in Patent No. 1,122,417. Any other suitable construction may be employed.

After the magazine A has been positioned upon the machine the closure 13 is lowered so as to permit the columns of bobbins in the magazine to settle upon a bobbin-feeding means located directly below the magazine. The means for unlocking and lowering the closure and for replacing and again locking the closure when the magazine is to be removed from the machine will now be described.

Two vertical guides 35 (Fig. 14) are rigidly fixed in the framework. Between said guides is mounted a slide 36 to the upper end of which is secured a table 37 to support the closure 13 and hold it against displacement in a horizontal plane. Each latch 17 is moved into and out of locking position by means comprising a bell-crank member 38 pivotally mounted upon the slide 36. The upwardly extending arms of the bell-crank members have notches 39 therein to receive an angular lug 40 upon the inner end of the adjacent latch 17. The bell-crank members are connected for simultaneous pivotal movement by means of gear segments 41 formed upon said members. One of the bell-crank members has an extension 42 in which is formed an elongated opening 43 through which extends a stud 44 carried by a bell-crank lever 45 pivoted at 46 in the framework of the machine. The stud 44 also extends through a cam slot 47 provided in the slide 36. The curved portion of the slot 47 is concentric with the pivot 46 when the slide 36 is in its upper position. 48 is a hand lever pivoted to the framework at 49 and rigid with a crank arm 50 which is connected by means of a link 51 to the bell-crank 45. When the hand lever 48 is depressed, the slide 36 is first caused to rise to elevate the table 37 beneath the closure 13, after which the continuing downward movement of the lever 48 causes the stud 44 to enter the curved portion of the slot 47, whereupon the slide ceases rising and the bell-crank members 38 are swung to move the upper arms of said bell-crank members apart. Friction will retain the parts in this position. A magazine filled with bobbins is then placed upon its seat in the machine, the lugs 40 of the latches 17 entering the notches 39. The operator then raises the hand lever 48, thus causing the latches 17 to be withdrawn from the slots 20. When the parts are in this position, lugs 38$^a$ on the bell-crank members 38 overlie a portion 13$^a$ of the closure, so that if the weight of the closure 13 and the bobbins in the magazine does not cause the closure to descend, the closure may be positively withdrawn by means of the lever 48.

Figure 3:
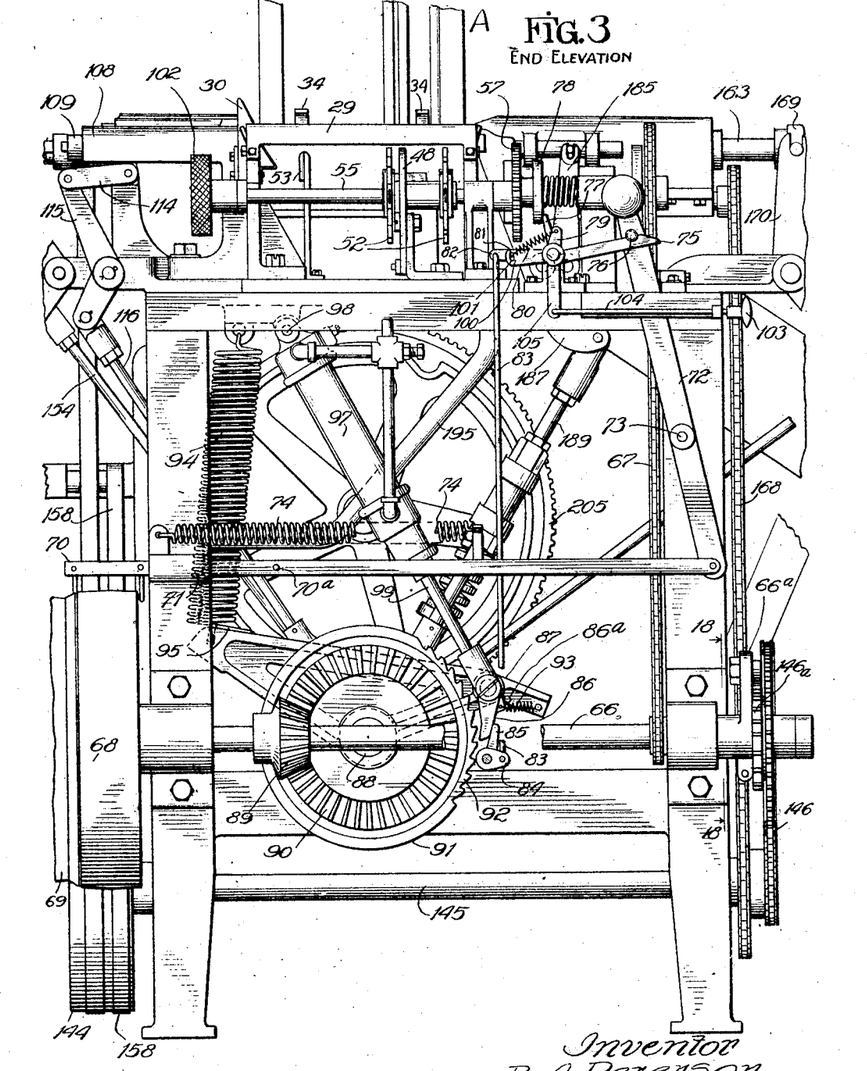
Fig. 3 is a fragmental front end elevation.

The bobbin-feeding means consists of a conveyor comprising two chains 52 (Figs. 1 and 3) each provided with recesses to receive bobbins, said chains being moved intermittently, the length of each movement being the distance between centers of two successive pairs of recesses. As the closure 13 is lowered into the space between the two chains, the columns of bobbins settle until the lowermost bobbin in each column lies within opposite recesses in the chains, the tips of the lowermost bobbins resting upon a supporting rail 53. As the conveyor travels, the bobbins thereon are moved under the columns and discharged at the right-hand side as viewed in Fig. 1. The columns of bobbins are exhausted in regular succession, beginning at the side at which the conveyor enters, namely, the left-hand side, referring to Fig. 1.

Figures 18, 19, 20, 21, 22, 23:
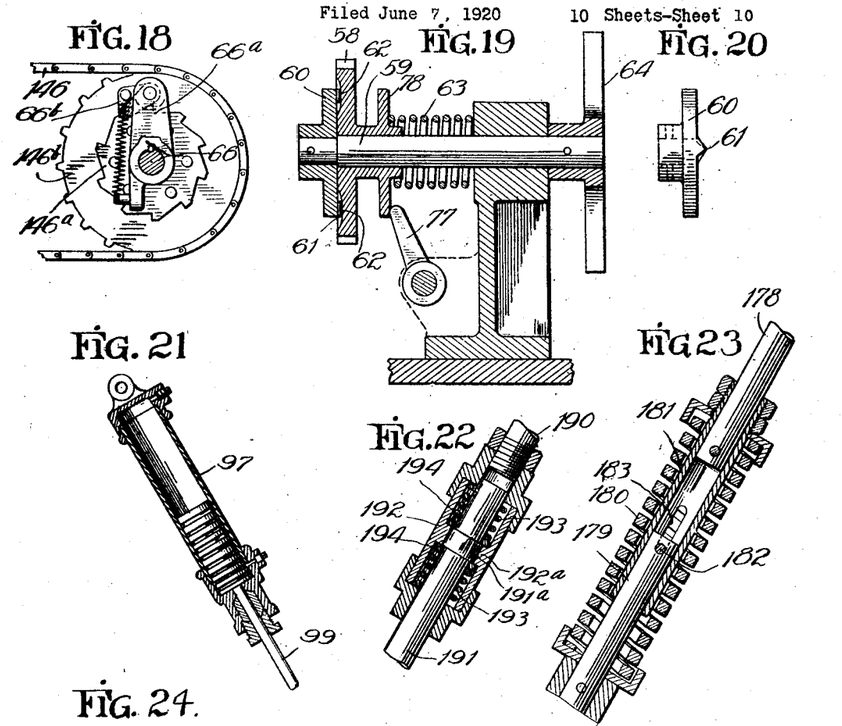
Fig. 18 illustrates a one-way drive comprised in a machine, the view being taken in the plane of line 18—18 of Fig. 3.
Fig. 19 illustrates a portion of the drive for the bobbin-feeding chains.
Fig. 20 illustrates one of the elements of said drive.
Fig. 21 is a sectional view of a device for checking momentum movement of the machine.
Figs. 22 and 23 are fragmental sectional views of yieldable links or connecting rods comprised in the machine.
Figure 24:
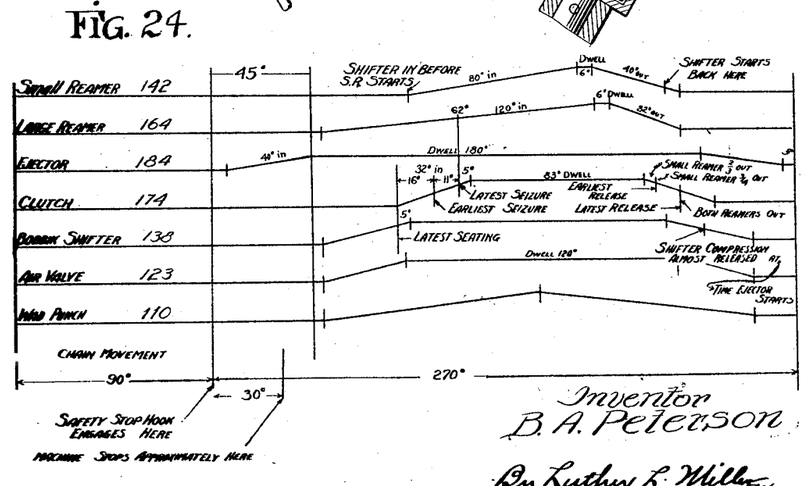
Fig. 24 is a chart illustrating the timing of the various mechanisms.

The upper runs of the bobbin-feeding chains are held against vertical and lateral displacement by guides 54. While traveling past the punching, blowing and reaming mechanisms, the bobbins are held against upward displacement by means including a stationary guide 54ª (Figs. 1 and 7) extending parallel with and overlying the path of the bobbin butts, and a guide 54ᵇ extending parallel with and overlying the tips or slender bodies of the bobbins. The guide 54ᵇ is attached to two arms 54ᶜ which are pivoted to the framework at 54ᵈ (Fig. 1) so that the guide 54ᵇ may be swung up out of the way if access to the bobbins is desired. The guide 54ᵇ is held in operative position by two bars 54ᵉ which are pivoted at one end to the framework, the opposite ends of said bars having notches 54ᵍ (Fig. 1ª) for engagement by headed studs 54ᶠ. The chains run over sprocket wheels mounted on shafts 55 and 56 (Fig. 2). On the shaft 55 is fixed a gear wheel 57 (Fig. 1) which meshes with a gear wheel 58 that is loosely mounted on a shaft 59 (Fig. 19). The gear wheel 58 is yieldingly driven by the shaft 59 by suitable means, as, for example, a disk 60 fixed on the shaft 59 and provided with teeth 61 (Figs. 19 and 20) adapted to lie in recesses 62 in one side of the gear wheel 58, and capable of slipping out of said recesses in case the gear wheel 58 should stop. An expansion spring 63 presses the gear wheel 58 against the disk 60. If the chains 52 should be prevented from moving by reason of clogging of the bobbins, the spring 63 allows the gear wheel 58 to spring away from the disk 60.

Figures 1, 1A:
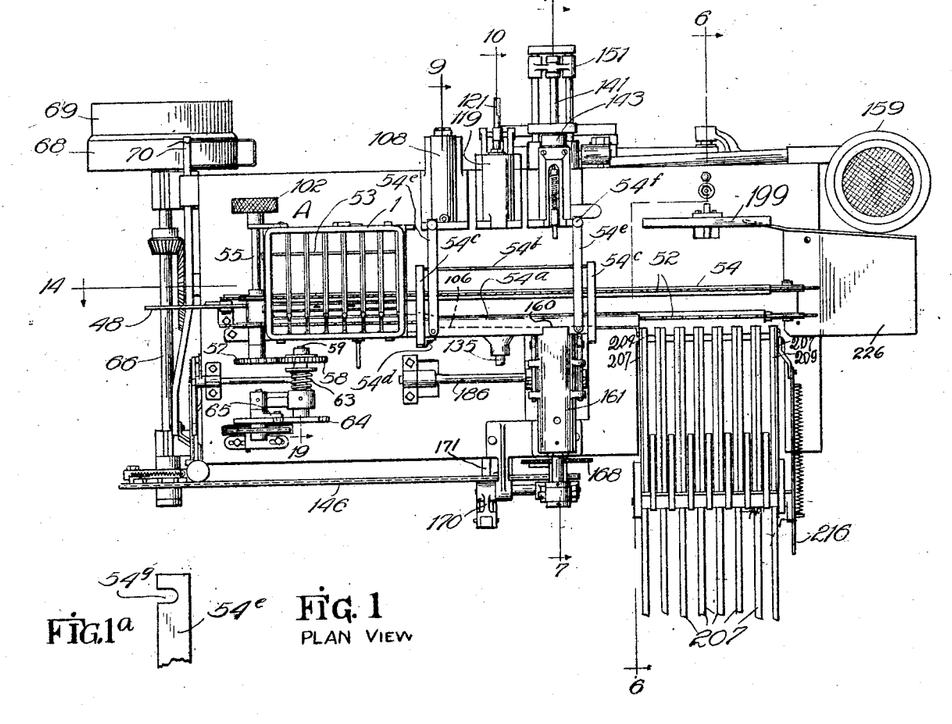

The shaft 59 is intermittently rotated by suitable means, as, for example, an ordinary Geneva stop-motion comprising a star wheel 64 and a pin disk 65 (Fig. 1.) The pin disk 65 is driven from the main shaft 66 through a chain belt 67. On the shaft 66 are mounted a drive pulley 68 and a loose pulley 69.

Means is provided for stopping the machine in case the movement of the bobbin-feeding chains is interfered with. The means herein shown for this purpose comprises a belt shifter 70 (Fig. 3) mounted in a guide 71 on the machine frame. One end of the belt shifter 70 is pivoted to the lower arm of a hand lever 72 which is pivoted at 73 to the machine frame. A contractile spring 74 connected at one end to the machine frame and at its other end to the belt shifter, tends to move the belt shifter in the direction to place the belt on the loose pulley, such movement being limited by a stop pin 70ª on the belt shifter. The belt shifter is normally held locked in the running position by means of a latch 75 engaging a stud 76 on the hand lever 72. The latch 75 is rigid with a finger 77 that bears against the side of a disk 78 which is fixed with relation to the gear wheel 58. Also rigid with the latch 75 and the finger 77 is an arm 79 which is connected by means of a spring 80 to a pin 81 on an arm 82. The arm 82 is mounted to swing on the axis of the parts 75, 77 and 79, and is connected by means of a link 83 to an arm 84 pivoted in the machine frame. Rigid with the arm 84 is a lug 85 that normally lies in contact with a pawl 86 which is pivoted upon one end of a bracket or lever 87. The lever 87 is pivotally mounted upon a shaft 88 which is driven from the shaft 66 through bevel gears 89 and 90. On the bevel gear 90 is a flange 91 having a plurality of ratchet teeth 92 adapted to engage the pawl 86. When the chains 52 are moving, the stop teeth 92 are passing under the pawl 86. A contractile spring 93 normally holds the pawl 86 out of the orbit of the teeth 92 and against a stop pin 86ª on the lever 87. A relatively strong contractile spring 94 connected at one end to the lever 87 and at its other end to the machine frame normally holds the lever 87 in the position shown in Fig. 3, the lever 87 being then in contact with a stop 95. 96 (Fig. 2) is a spring arm arranged to be engaged by the lever 87 to yieldingly limit movement of said lever in one direction. An oil-check cylinder 97 (Figs. 3 and 21) is pivoted to the machine frame at 98 and has a piston rod 99 which is pivoted to the lever 87.

Rigid with the arm 79 is an arm 100 having a slot 101 through which the pin 81 extends. When the gear wheel 58 is forced away from the disk 60 the latch 75 is moved out of engagement with the stud 76, whereupon the spring 74 shifts the drive belt to the loose pulley. The arm 100 also acts upon the pin 81 to raise the arm 82 and thus force the pawl 86 into engagement with one of the teeth 92. The momentum of the various mechanisms of the machine is thereupon absorbed by the spring 94, the oil-check cylinder 97 serving to yieldingly check the movements of the lever 87, first as the spring 94 is extended, and then as said spring revolves the shaft 88 in the reverse direction. When the shaft 88 comes to rest and the pressure of the ratchet tooth against the pawl 86 is relieved, the spring 93 withdraws the pawl 86 into the normal position. For convenience in manually operating the conveyor when removing the cause of the stoppage, there is provided a hand wheel 102 on the conveyor-drive shaft 55. When the trouble has been remedied the operator operates the hand lever 72 to shift the belt to the tight pulley, the belt being retained in this position by means of the latch 75.

The machine may be stopped at will by pressing inwardly upon a knob 103 (Fig. 3) on a rod 104, said rod being connected to an arm 105 which is rigid with the latch 75 on the arm 100.

Figures 9, 11:
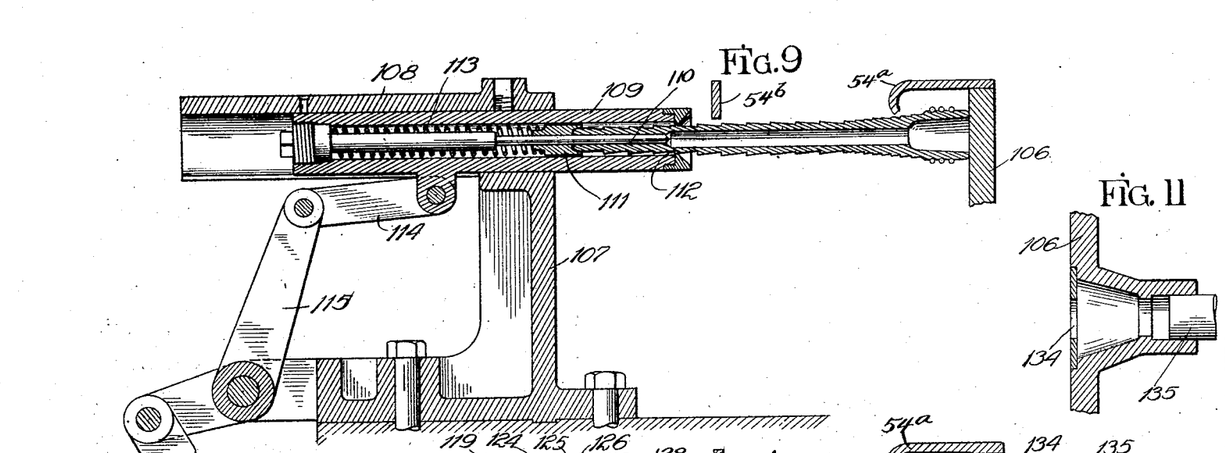
Fig. 9 is a vertical sectional view taken in the plane of dotted line 9 of Fig. 1 and showing the means for driving yarn out of the upper end of the bore of the bobbin.
Fig. 11 is a section on line 11 of Fig. 10.

The means herein shown for driving yarn, etc. out of the small portion of the bore of the bobbins is illustrated in Fig. 9, and comprises an abutment in the form of a wall or flange 106 extending along the path of movement of the bobbin butts. Opposite the abutment 106 is a bracket 107 having a guide 108 for a sleeve or casing 109 arranged to reciprocate perpendicularly to the path of travel of the bobbins. The casing 109 is adapted to receive the tip of a bobbin, the forward or inner end of the casing being counterbored to direct the bobbin into the casing. A punch 110 is fixed at its rear end to the casing and extends axially of the casing in position to occupy the restricted portion of the bore of the bobbin. Slidably mounted on the punch 110 is a stripper sleeve 111 which is normally held forward against a stop shoulder 112 by an expansion spring 113. The forward end of the stripper sleeve 111 is made concave to fit the tip of the bobbin. The element 111 serves to clamp and center the bobbin.

The casing 109 is reciprocated by means of a link 114 (Fig. 3), a bell-crank 115, a link 116, and a cam 117 on the shaft 88.

Figure 10:
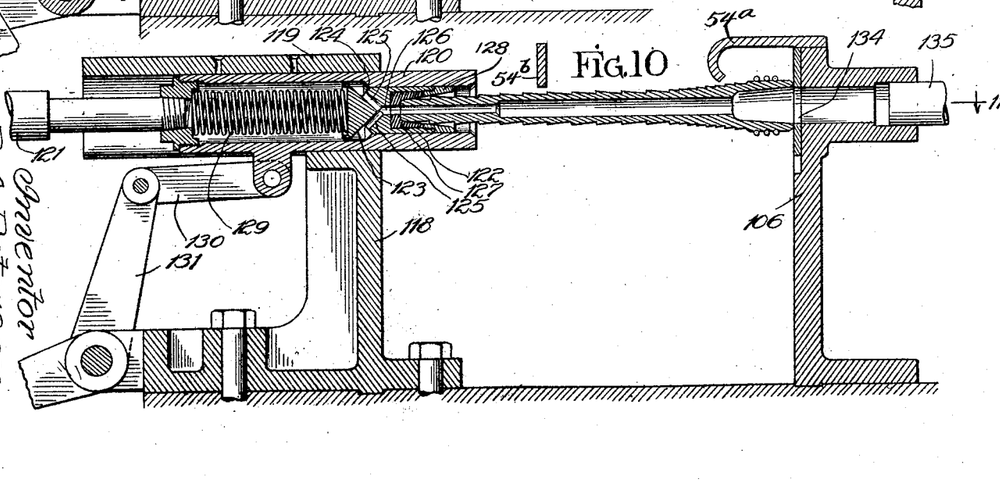
Fig. 10 is a vertical sectional view taken in the plane of dotted line 10 of Fig. 1 and showing the means for blowing out of the bobbin the yarn displaced by the mechanism shown in Fig. 9.

In the step-by-step movement of the chains 52, the bobbins are brought one by one into axial alinement with the casing 109. The casing is then advanced, the stripper sleeve 111 yielding as the punch 110 is forced into the bobbin. Said punch drives out of the restricted portion of the bore of the bobbin any yarn or other matter contained therein. As the casing 109 and the punch 110 are retracted, the sleeve 111 strips the bobbin off the punch. The bobbin-feeding chains then advance the bobbin to a device for blowing out the wad of yarn or other material acted on by the punch 110. This device comprises a bracket 118 (Fig. 10) having a guide 119 in which a casing 120 is mounted to reciprocate perpendicularly to the direction of movement of the bobbins. Air is supplied under pressure to the casing 120 through a flexible connection 121. The escape of air from the casing 120 is controlled by a valve member 122 mounted in the inner end of the casing 120 for reciprocation along the axis of the casing. On the valve member is a conical valve surface 123 adapted to seat against a similar surface 124 in the casing. Ports 125 formed in the valve member extend from points adjacent to the valve surface 123 to a central port 126. Surrounding the port 126 is a rubber gasket 127 which is recessed to receive the tip of a bobbin. The gasket is held in place by a tubular bobbin-centering member 128. An expansion spring 129 normally holds the valve member 122 forward with the valve surface 123 pressed against its seat 124.

The means for reciprocating the casing 120 comprises a link 130, a bell-crank lever 131, a link 132 (Fig. 2) and a cam 133 on the shaft 88.

In the abutment 106 is a port 134 which is alined with the port 126 and communicates with a tube 135. Said tube extends to a suitable receptacle (not shown).

When a bobbin is carried by the conveyor into alinement with the casing 120 and the port 134, said casing is advanced toward the bobbin, the gasket 127 engaging the tip of the bobbin and the valve member 122 being thereby unseated, whereupon air is forced under pressure through the bobbin, blowing out the wad of yarn. The casing 120 is then retracted until it is clear of the bobbin, after which the bobbin is advanced by the conveyor into alinement with a reaming mechanism.

Figure 7:
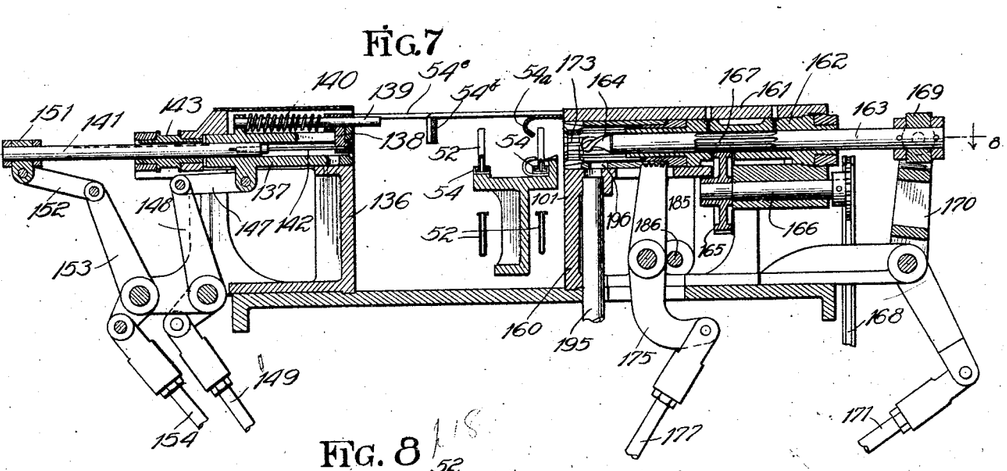
Fig. 7 is a fragmental vertical section on line 7—7 of Fig. 1 and illustrating the reaming mechanism.
Figure 8:
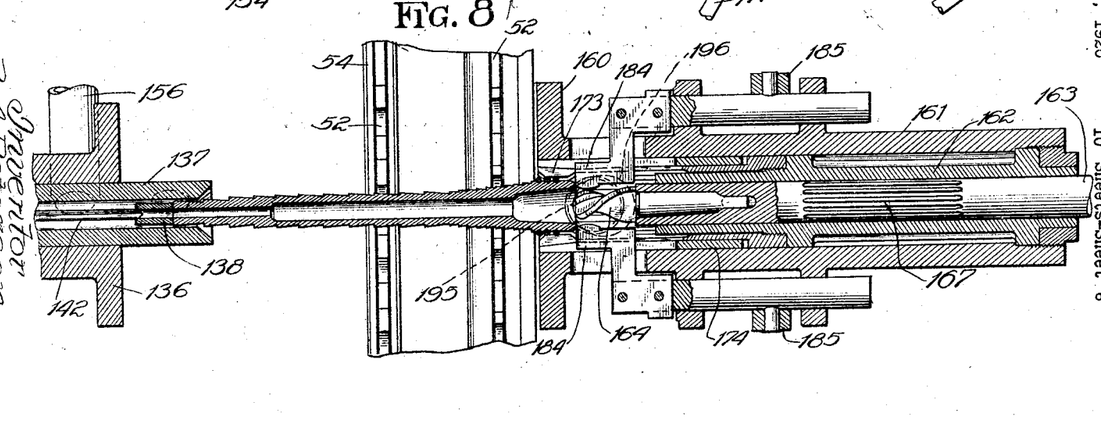
Fig. 8 is a horizontal sectional view taken in the plane of dotted line 8 of Fig. 7.

The form of reaming mechanism employed in the present embodiment of the invention is illustrated in Figs 7 and 8. It comprises two reamers for simultaneously reaming the opposite ends of a bobbin. The means for reaming the tip of the bobbin comprises a bracket 136 in which a tubular member 137 is mounted for reciprocation longitudinally of the bobbin. In the forward portion of the member 137 is a clamp or stripper 138 adapted to bear against the tip end of the bobbin. Said clamp or stripper is slidably mounted on a rod 139 which is fixed at its rear end to the member 137, the forward portion of the rod 139 being slidable in the bracket 136. An expansion spring 140 normally holds the stripper 138 in the position shown in Fig. 7.

An arbor 141 is rotatably mounted in and extends axially of the member 137. To the forward end of the arbor is fixed a reamer 142. A pulley 143 is rotatably mounted in the bracket 136. The arbor 141 extends slidably through the pulley 143 and is splined thereto. The pulley 143 is belted to a pulley 144 on a shaft 145. Power is communicated from the shaft 66 to the shaft 145 through a chain belt 146. In the present embodiment of the invention, the pulley 144 is made massive enough to act as a flywheel in order that the reamers shall be driven with sufficient force and steadiness.

On account of the momentum of the parts driven by the shaft 145, it is impracticable to stop them by the means used to arrest the shaft 88. An overrunning drive connection is therefore employed between the shafts 66 and 145. Herein is shown an arm 66ª (Figs. 3 and 18) fixed on the shaft 66 and carrying a spring-pressed pawl 66ᵇ that engages a ratchet wheel 146ª which is rotatable on the shaft 66. Rigid with the ratchet wheel is a sprocket wheel 146ᵇ over which the chain 146 runs. If the shaft 66 should be stopped by the pawl 86, the shaft 145 revolves until its momentum is spent, the teeth of the ratchet wheel 146ª sliding past the pawl 66ᵇ.

The means for reciprocating the member 137 (Fig. 7) consists of a link 147, a bell-crank lever 148, a link 149, and a cam 150 (Fig. 2) on the shaft 88. The arbor 141 is reciprocated by means of a cross-head 151 (Figs. 1 and 7), a link 152, a bell-crank 153, a link 154 and a cam 155 on the shaft 88.

To carry away the dust produced by the reamer 142 I provide an exhaust tube 156 (Figs. 2 and 8) communicating with the interior of a tubular member 137 and with a fan 157. The fan is driven from the pulley 144 by means of a belt 158, and delivers the dust to a centrifugal collector 159.

The means herein shown for reaming the lower part of the bore of the bobbin comprises a bracket 160 (Figs. 7 and 8) the face of which is in alinement with the wall 106, said bracket having a sleeve portion 161. In this sleeve portion is fixed a member 162 in which is rotatably and slidably mounted an arbor 163. Said arbor is alined with the arbor 141, and is adapted to carry a reamer 164. The arbor 163 is rotated by means of a spur gear wheel 165 mounted on a shaft 166 in the bracket 160, said gear wheel meshing with elongated pinion teeth 167 milled in the arbor. The shaft 166 is driven from the shaft 145 through a chain belt 168.

The arbor 163 is reciprocated by means of a cross-head 169 in which the arbor is rotatable, a bell-crank lever 170 engaging said cross-head, a link 171, and a cam 172 on the shaft 88.

To hold the butt of the bobbin while it is being reamed, there is provided a chuck consisting of a collet 173 connected to the member 162, and a sleeve 174 surrounding the collet and arranged to be reciprocated to contract and release said collet. The sleeve 174 is reciprocated by means of a bell-crank lever 175, the upper arm of which has a gear segment that meshes with teeth formed in the sleeve. The other arm of the lever 175 is actuated by a cam 176 on the shaft 88 through a link 177. Said link is preferably of such construction as to yield if the bobbin is securely clamped before the cam 176 has completed its chuck-closing movement. As shown in Fig. 23, the link comprises two telescoping members 178 and 179 normally held extended by an expansion spring 180. The telescoping connection is obtained by securing to the member 178 a tube 181 into which the member 179 extends. A pin 182 fixed in the member 179 extends slidably through slots 183 in the tube 181.

The means for ejecting the bobbin from the chuck comprises two fingers 184 (Fig. 8) mounted to slide longitudinally of the chuck and arranged to be moved by two arms 185 fixed upon a rock shaft 186 (Fig. 1). On said shaft is an arm 187 which is actuated by cam 188 (Fig. 2) on the shaft 88 through a link 189 which is preferably yieldable in both directions to allow for shock or sticking of the reamer 164 as it enters or leaves the bobbin. The form of link shown in Fig. 22 comprises two rod-sections 190 and 191, a spring casing 192 attached to the rod-section 190 and slidable on the other rod-section, and two expansion springs 193 enclosed in said casing and bearing against washers 194 which lie at opposite sides of a collar or flange 191ª on the rod-section 191. The springs 193 normally hold the washers 194 against an internal flange 192ª in the spring casing. The flanges 191ª and 192ª are of the same width, and consequently the springs normally hold the rod-sections in such relation as to make the link of a certain predetermined length.

To remove the dust produced by the reamer 164, I provide a suction tube 195 (Fig. 7) communicating with the bore in which the chuck is mounted. 196 is an opening in the sleeve 174 establishing communication between the tube 195 and the interior of the collet 173 through the spaces between the collet fingers. The tube 195 is connected to the fan 157.

After the bobbin has been reamed and disengaged from the tubular member 137 and the chuck 173, it is advanced by the chains 52 into operative relation to a means for assembling bobbins for insertion into the magazine B. In the present embodiment of the invention there is employed a device for simultaneously pushing seven bobbins off the chains 52 and into a structure adapted to position the bobbins for insertion into the seven compartments of the magazine. The pushing device alluded to comprises a bell-crank lever 197 (Fig. 6) pivoted in the machine frame at 198 to swing in a plane perpendicular to the path of the bobbin-feeding chains. The upper arm of the lever 197 carries a bar 199 so located and dimensioned as to be adapted to strike the tips of seven bobbins lying upon said chains. The lower arm of the lever 197 carries a roller 200 which is pressed against a cam 201 by a contractile spring 202 adjustably connected at one end to a stationary part and attached at its other end to an arm 203 of the lever 197. 204 is a spring buffer adapted to be struck by the arm 203 to cushion the contact of the roller 200 with the low portion of the cam 201. Said cam is rigid with a spur gear wheel 205 that meshes with a pinion 206 on the shaft 88.

The bobbin positioning structure above referred to, comprises inclined bars 207, the spaces between said bars being smaller than the diameter of a bobbin butt. The bars 207 extend downwardly from points adjacent to the bobbin-feeding chains to a support for the magazine to be loaded. The upper portions of the bars 207, with the attendant devices to be later described, constitute a structure wherein each set of seven bobbins comes to rest with the butts uppermost. The lower portions of the bars 207 constitute a storage rack upon which the bobbins hang until a sufficient number has accumulated to fill a magazine.

Above the upper portions of said bars are partitions 208 having flanges 209 (Fig. 16) to prevent the bobbins from flying out through the spaces between said partitions. Below, the bars 207 are plates 210 to guide the tips of the bobbins. A rock shaft 211 (Fig. 6) is supported above the bars 207 and has fixed thereto seven fingers 212 which normally extend down into the spaces between the partitions 208 and serve to prevent the bobbins from sliding farther down the bars 207. Rigid with the stop fingers 212 are seven fingers 213 adapted to swing down between the partitions 208 and the bars 207. After the bar 199 has driven a set of seven bobbins off the chains 52, the shaft 211 is rocked to cause the fingers 213 to push said bobbins along the bars 207 to a place below the stop fingers 212.

The shaft 211 is rocked by means of a cam 214 rigid with the spur gear wheel 205 and engaging a roller carried by one arm of a lever 215 pivoted in the machine frame. The roller is held against the cam by a spring 215ᵃ. To the other arm of the lever 215 is pivoted a link 216 having a slot 217 in which lies a pin 218 on a crank arm 219 on the shaft 211. A contractile spring 220 tends to hold the pin 218 against one end wall of the slot 217 and yieldingly transmits motion from the link 216 to the arm 219 to impart to the fingers 213 their bobbin-advancing movement.

At the lower end of the bars 207 is a support for the magazine B. (See Fig. 17.) In the present embodiment, said support comprises the inclined frame members 221 having stops 222 for the lower end of the magazine. The upper end of the magazine lies between two projections 223 which serve to hold the magazine in proper position with each of its compartments in the vertical plane of one of the channels defined by the elements 207, 208 and 210. To retain bobbins in said channels until it is desired to place bobbins in the magazine, there is provided a bar 224 mounted at the lower end of the bobbin-guiding structure for horizontal movement transversely of said channels and above the bars 207. Above the discharge end of said channels is a guard 225 having an inclined lower side adapted to force down any bobbins which may have been crowded by other bobbins up out of position to enter the magazine. 226 is a chute through which bobbins may be discharged in case the pusher bar 199 be held out of action.

In use, the lever 48 (Fig. 14) is depressed, thus raising the table 37. A magazine is then placed on its seat in the machine, the lugs 40 (Fig. 13) on the latches in the closure 13 of said magazine entering the recesses 39 of the latch-operating levers 38 of the table 37. The lever 48 is then raised, thereby unlocking the closure 13 of the magazine and allowing the table 37, the closure 13 and the bobbins to drop, the bobbins settling upon the chains 52. The operator then sets the machine in operation by shifting the drive belt to the tight pulley 68 by means of the lever 72. The chains 52 withdraw bobbins from beneath the magazine and advance them in succession to the several mechanisms of the machine. If we follow a given bobbin through the machine we find that the chains 52 stop with the bobbin substantially alined with the sleeve or casing 109 (Fig. 9). Said casing is then advanced, the element 111 pushing the bobbin against the abutment 106 and holding it there while the punch 110 forces out of the restricted bore of the tip of the bobbin any yarn or other foreign matter contained therein. The casing 109 and the punch 110 are then retracted, the element 111 stripping the bobbin off the punch. The chains then carry the bobbin into substantial alinement with the casing 120 (Fig. 10) and the port 134. Said casing is then advanced, the member 122 pushing the bobbin against the abutment 106 and admitting a blast of air to the bore of the tip of the bobbin, thus blowing out of the bobbin the wad of yarn which was forced out of the restricted bore by the punch 110. The casing 120 is then withdrawn out of engagement with the bobbin, which latter is then advanced into alinement with the reaming mechanism (Figs. 7 and 8). The casing 137 is projected onto the tip of the bobbin, the shifter member 138 pushing the bobbin into the collet 173 and into contact with the members 184. A few seconds after the bobbin has been seated in the collet, the collet is contracted into engagement with the bobbin by the sleeve 174, and the reamers 142 and 164 are projected into the opposite ends of the bobbin, and then withdrawn therefrom. By the time the reamers are out of the bobbin, the chuck has been opened. At a point in the retraction of the casing 137 where the member 138 has almost ceased to press against the bobbin, the ejectors 184 begin to push the bobbin out of the chuck.

The resilient mounting of the stripper or shifter 138 provides for variations in the lengths of the bobbins, while the yielding character of the link 177 takes care of variations in the diameters of the bobbin butts.

Figure 6:
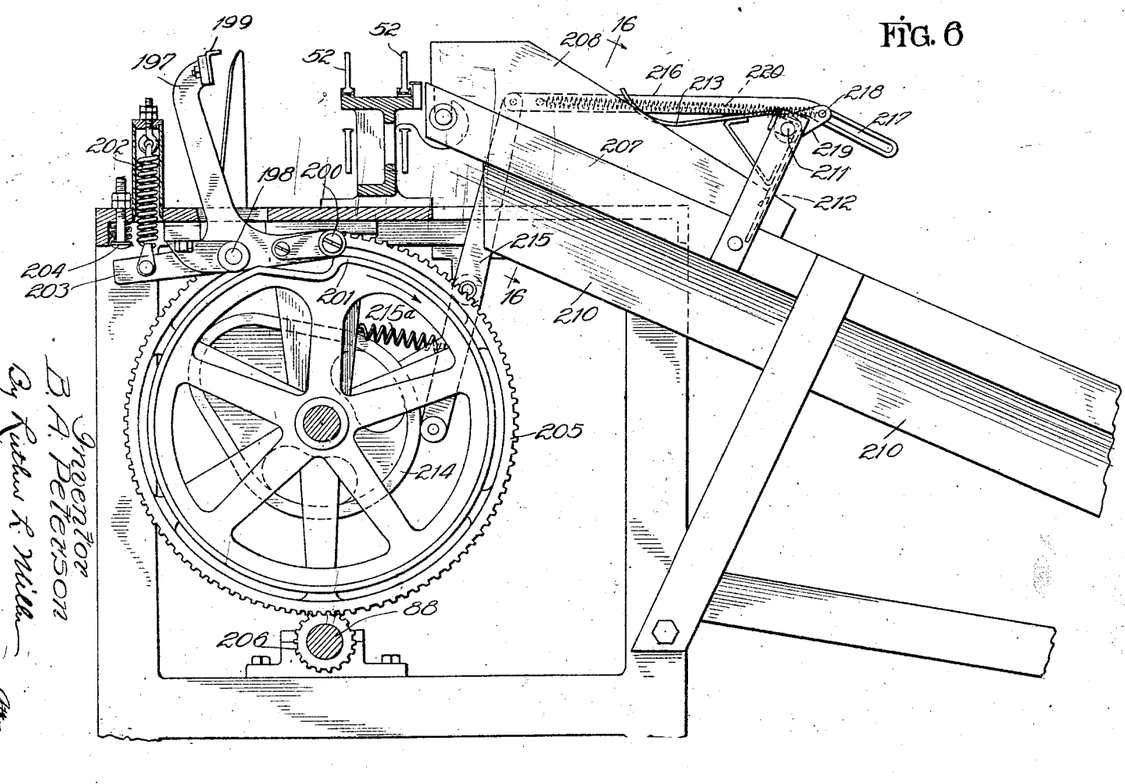
Fig. 6 is a vertical sectional view taken in the plane of dotted line 6—6 of Fig. 1, upon an enlarged scale.

After the bobbin has been reamed the chains 52 carry it into position opposite the bar 199 (Fig. 6). When seven bobbins are opposite said bar, the latter is actuated to drive said bobbins off the chains and into the bobbin-positioning structure. The fingers 213 are then actuated to push the bobbins farther down the bars 207. When a sufficient quantity of bobbins has accumulated upon the bars 207, the stop bar 224 is withdrawn and the bobbins pushed by hand into a magazine previously placed upon its seat 221.

Before removing the supply magazine A from the machine, the closure 13 is replaced and latched by depressing the hand lever 48.

It will be understood that various features of this invention may be usefully employed in other combinations of mechanisms; that the invention is capable of use in connection with various forms of bobbins; that bobbins may be supplied from any suitable source and not necessarily from a doffer magazine; that the bobbins after treatment may be discharged into any suitable receptacle; and that numerous modifications of the several bobbin-treating mechanisms may be made without departing from the spirit of the invention as defined by the appended claims.

I claim as my invention:—

1. The combination of means for clamping and releasing a bobbin, means for punching a wad of foreign matter from the bore of the tip of a bobbin while clamped, a second means for clamping and releasing a bobbin, means for inducing an air current through the bobbin while held by the second clamping means, means for engaging and releasing the tip of a bobbin, means for reaming the tip of a bobbin while held by said engaging means, means for engaging and releasing the butt of a bobbin, means for reaming the butt while held by said butt-engaging means, means for assembling bobbins for insertion into a magazine, devices for conveying bobbins to said means, and means for actuating said means and conveying devices in timed relation to one another to act upon the bobbins singly and in regular succession in the order stated.

2. The combination of means for clamping and releasing a bobbin, means for punching a wad of foreign matter from the bore of the tip of a bobbin while clamped, a second means for clamping and releasing a bobbin, means for inducing an air current through the bobbin while held by the second-named clamping means, means for engaging and releasing the tip of a bobbin, means for reaming the tip of a bobbin while held by said engaging means, means for engaging and releasing the butt of a bobbin, means for reaming the butt while held by said butt-engaging means, devices for conveying bobbins to said means, and means for actuating said means and conveying devices in timed relation to one another to act upon the bobbins singly and in regular succession in the order stated.

3. The combination of means for punching a wad of foreign matter from the bore of the tip of a bobbin, means for inducing an air current through a bobbin, means for reaming the tip of a bobbin, means for reaming the butt of a bobbin, devices for conveying bobbins to said means, and means for actuating said means and conveying devices in timed relation to one another to act upon the bobbins singly and in regular succession in the order stated.

4. The combination of means for inducing an air current through a bobbin, means for reaming the tip of a bobbin, means for reaming the butt of a bobbin, devices for conveying bobbins to said means, and means for actuating said means and conveying devices in timed relation to one another to act upon the bobbins singly and in regular succession in the order stated.

5. The combination of a bobbin reamer, means to rotate the reamer, means for moving a bobbin to the reamer, a drive for said reamer-rotating means and moving means, a one-way transmission between said drive and the reamer-rotating means, and means to stop the drive in case of stoppage of said moving means.

6. An organized machine for cleaning and truing bobbins having, in combination, a bobbin conveyor movable step by step; a wad punch, a blower, and a bobbin tip reamer located along one side of the conveyor in the order stated; an abutment at the other side of the conveyor opposite the wad punch, said abutment having an outlet port opposite the blower; a bobbin butt reamer opposite the bobbin tip reamer; guides above the conveyor for preventing upward displacement of the bobbins; and means for actuating the conveyor, wad punch, blower and reamers in timed relation to one another.

7. A bobbin-reconditioning machine having, in combination, means for supporting a bobbin, and a punch arranged to be reciprocated into and out of the tip of the bobbin to drive foreign matter therefrom.

8. A machine for cleaning and truing bobbins, having, in combination, means for inducing an air current through a bobbin, a bobbin-tip reamer, a bobbin-butt reamer axially alined with the other reamer, a conveyor for conveying bobbins to said air-current-inducing means and reamers, and means for actuating said air-current inducing means, reamers and conveyor in timed relation to one another to act upon the bobbins singly and in regular succession in the order stated.

9. The combination of means for supporting a bobbin, a reciprocatory tubular member adapted to be passed over the tip of the bobbin, a yieldably mounted member within said tubular member to engage the tip of the bobbin, a chuck into which the butt of the bobbin is pushed by said yieldably mounted member, and a tool arranged to be reciprocated into and out of the tip of the bobbin while held by said yieldably mounted member and chuck.

In testimony whereof, I have hereunto set my hand.

BURT A. PETERSON.

Certificate of Correction.

It is hereby certified that the name of the assignee in Letters Patent No. 1,591,643, granted July 6, 1926, upon the application of Burt A. Peterson, of Rockford, Illinois, for an improvement in " Bobbin Treating and Handling Mechanism," was erroneously written and printed as " Barber-Coleman Company," whereas said name should have been written and printed as *Barber-Colman Company*, as shown by the records of assignments in this office; and that the said Letters Patent should be read with this correction therein that the same may conform to the record of the case in the Patent Office.

Signed and sealed this 17th day of August, A. D. 1926.

[SEAL.]

M. J. MOORE,
*Acting Commissioner of Patents.*